United States Patent
Braga (10) Patent No.: US 10,013,001 B2
(45) Date of Patent: Jul. 3, 2018

(54) DYNAMIC BALANCING VALVE FOR CONTROL OF FLOW RATE INDEPENDENTLY OF PRESSURE

(71) Applicant: VIR VALVOINDUSTRIA ING. RIZZIO S.P.A., Valduggia (Vercelli) (IT)

(72) Inventor: Marco Braga, Borgosesia (IT)

(73) Assignee: VIR VALVOINDUSTRIA ING. RIZZIO S.P.A., Valduggia (Vercelli) (IT)

( * ) Notice: Subject to any disclaimer, the term of this patent is extended or adjusted under 35 U.S.C. 154(b) by 60 days.

(21) Appl. No.: 15/106,335

(22) PCT Filed: Nov. 19, 2014

(86) PCT No.: PCT/EP2014/075001
§ 371 (c)(1),
(2) Date: Jun. 20, 2016

(87) PCT Pub. No.: WO2015/090817
PCT Pub. Date: Jun. 25, 2015

(65) Prior Publication Data
US 2017/0003692 A1   Jan. 5, 2017

(30) Foreign Application Priority Data

Dec. 19, 2013  (IT) .............................. MI2013A2133

(51) Int. Cl.
G05D 7/06       (2006.01)
G05D 7/00       (2006.01)
(Continued)

(52) U.S. Cl.
CPC ........... G05D 7/0635 (2013.01); G05D 7/005 (2013.01); G05D 7/0106 (2013.01);
(Continued)

(58) Field of Classification Search
CPC ...... G05D 7/014; G05D 7/005; G05D 7/0106; G05D 7/0635; G05D 16/0655; Y10T 137/87981–137/88038; Y10T 137/7791
(Continued)

(56) References Cited

U.S. PATENT DOCUMENTS 2,866,477 A * 12/1958 Bredtschneider ......... F16K 1/38
                                                        137/614.18
3,630,228 A * 12/1971 Turner .................. F16K 15/026
                                                        137/484.2
(Continued)

FOREIGN PATENT DOCUMENTS

WO   2004107075   12/2004
WO   2006136158   12/2006
WO   2009135490   11/2009

OTHER PUBLICATIONS

International Search Report and Written Opinion of the International Searching Authority PCT/EP2014/075001 dated Mar. 16, 2015.

*Primary Examiner* — William McCalister
(74) *Attorney, Agent, or Firm* — Young & Thompson (57) ABSTRACT

Pressure independent flow rate control valve, for placement in hydraulic systems between upstream inlet and downstream outlet ducts, including a first functional unit arranged between the inlet and outlet ducts, mobile equipment actuated manually or by an actuator for setting and modifying the orifice span of a fluid passage, and thus the valve flow rate, up to complete closure; and a second functional unit for maintaining the differential pressure constant between upstream and downstream of the first unit, and thus the set valve flow rate independently of pressure fluctuations in the hydraulic system. The mobile equipment includes main equipment and secondary equipment which can linearly translate with respect to the main equipment for presetting the maximum valve flow rate, the main equipment carrying integrally the secondary equipment and being linearly displaced by the actuator for modulating the fluid flow rate from the preset maximum one up to complete closure.

17 Claims, 9 Drawing Sheets

(51) Int. Cl.
*G05D 7/01* (2006.01)
*G05D 16/06* (2006.01)

(52) U.S. Cl.
CPC .... *G05D 16/0655* (2013.01); *Y10T 137/7791* (2015.04); *Y10T 137/87981* (2015.04); *Y10T 137/88038* (2015.04)

(58) Field of Classification Search
USPC .............................. 137/503, 614.11–614.18
See application file for complete search history.

(56) References Cited

U.S. PATENT DOCUMENTS

| | | | | |
|---|---|---|---|---|
| 4,791,956 A * | 12/1988 | Kominami | ............. | F16K 17/34 137/503 |
| 5,178,324 A * | 1/1993 | Moesby | ................ | F24D 10/006 137/455 |
| 5,566,711 A * | 10/1996 | Glansk | ..................... | F16K 1/10 137/557 |
| 6,527,195 B2 * | 3/2003 | Moesby | ................ | G05D 23/023 137/503 |
| 6,688,319 B2 * | 2/2004 | Trantham | ............... | F25B 41/062 137/2 |
| 6,725,880 B1 * | 4/2004 | Liu | ...................... | G05D 7/0126 137/501 |
| 7,621,461 B2 * | 11/2009 | Trantham | ............. | G05D 23/022 236/100 |
| 7,735,514 B2 * | 6/2010 | Marstorp | ................ | F16K 1/526 137/501 |
| 7,770,595 B2 * | 8/2010 | Kirchner | ................ | G05D 7/014 137/501 |
| 8,231,102 B2 * | 7/2012 | Loeffler | .................. | F16K 1/443 137/503 |
| 8,596,296 B2 * | 12/2013 | Rasmussen | ............. | F16K 1/526 137/315.04 |
| 2010/0043893 A1 * | 2/2010 | Stenberg | ................ | F16K 1/465 137/511 |
| 2010/0170581 A1 | 7/2010 | Loeffler | | |
| 2011/0240148 A1 * | 10/2011 | Norlander | ........... | F24D 19/1015 137/535 |

* cited by examiner

DYNAMIC BALANCING VALVE FOR CONTROL OF FLOW RATE INDEPENDENTLY OF PRESSURE

BACKGROUND OF THE INVENTION

The present invention relates to a valve for dynamic balancing of the flow rates of thermal carrier fluid independent of the fluctuations of pressure in hydraulic systems in an environment of HVAC (heating, ventilation and air conditioning) and of distribution of sanitary water and automatic regulation of the flow rate of feeding of terminal units, heat exchangers, fan coils, AHU batteries, metering units and the like.

Figure 1:
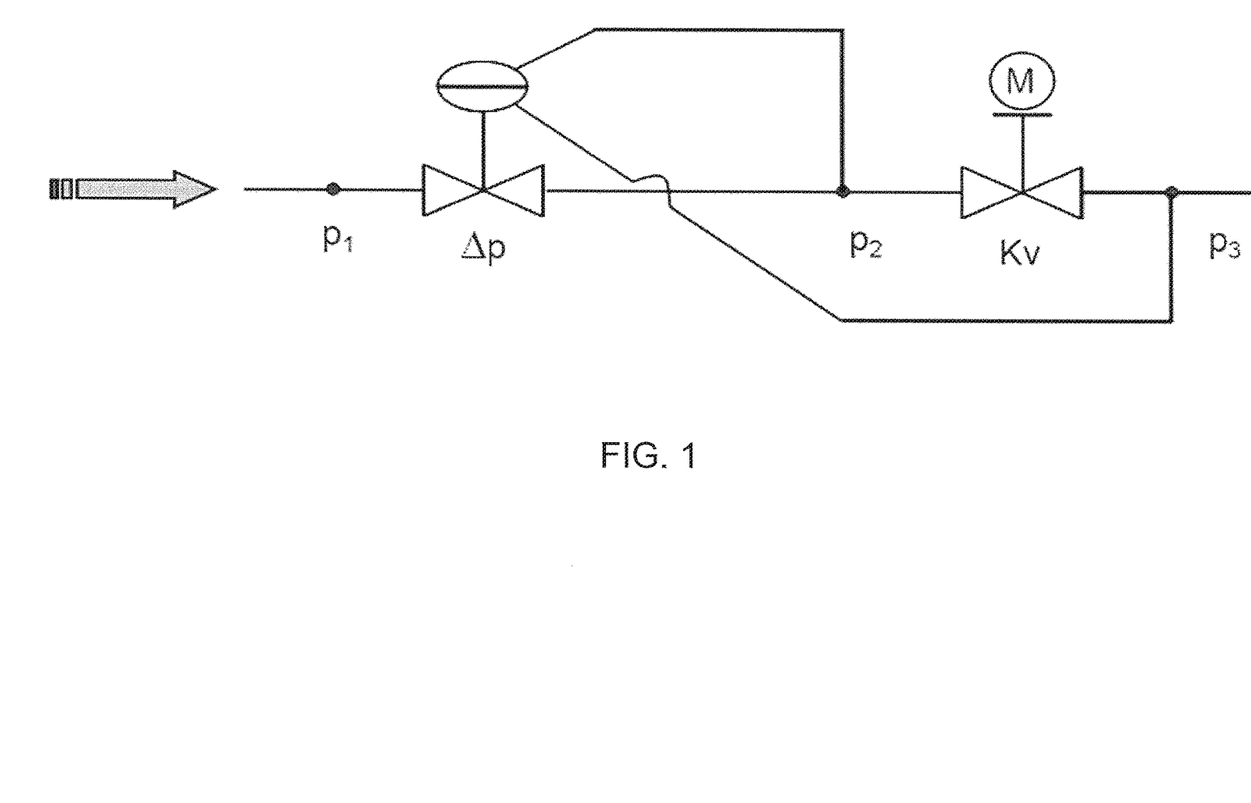
FIG. 1 is a functional diagram of a PICV valve.

In the scope defined, the abovementioned valves, known as PICV (pressure independent control valves) whereof a schematic representation (typical but not the only one possible) is given in the accompanying FIG. 1, are multifunction instruments typically made up of a functional unit "Δp" suitable for maintaining constant the differential pressure between upstream and downstream of a functional unit "Kv", the latter being made up of at least one orifice whose area of passage can be made to vary up to total closure by means of manual actuation and/or by means of an actuator "M" of whatsoever kind.

Knowing that by fixing the area of passage of an orifice and maintaining the pressure differential between its upstream and its downstream constant means that the volumetric rate of flow which can pass through it is fixed, the PICV valves therefore carry out typically the following functions:

1) manual presetting of the maximum rate of flow which can transit through the open valve; maintaining of the flow rate set independently of the fluctuations of the pressures in the hydraulic system which follow the variation required or undergone of the conditions of use in the various branches of the system and of the utilities connected thereto;
2) motorised modulation of the flow rate regulated between the maximum presetting value and the other possible regulated reductions;
3) on-off function, i.e. the change from position of flow rate regulated to stop of the flow rate and vice versa, both for the purpose of energy saving and saving in maintenance, function performed manually and/or by means of an actuator.

Referring to the diagram of FIG. 1, typically the functional unit "Δp" assigned to function 2), i.e. maintaining constant the pressure differential $P_2-P_3$ on either side of the regulation unit "Kv", is made with a cut-off which chokes an orifice, cut-off actuated by a diaphragm which senses the differential pressure $P_2-P_3$: when the variations in pressures upstream of the valve $P_1$ or downstream of the valve $P_3$ seek to vary also the differential $P_2-P_3$, the diaphragm senses an imbalance in the design value and therefore moves the lamination cut-off which will vary the differential $P_1-P_2$ in an opposed manner so that the value $P_2-P_3$ will be restored to the design one.

This balancing of the flow rate independently of the fluctuations of the pressures, to be considered in itself known, will be described in greater detail here below with reference to the drawings of the valve according to the invention.

The functional unit "Kv" is assigned to perform the other functions 1), 3) and 4).

The function 1) of presetting is typically performed by an orifice/cut-off pair wherein the position of the cut-off relative to the orifice is made to change with manual mechanical operations, typically on installation of the valve or in any case during one-off regulation or maintenance of the system, consequently varying the area of passage and therefore the maximum rate of flow which from that time onwards may traverse it.

The function 3 of modulation of the flow rate is typically performed by an orifice/cut-off pair wherein the position of the cut-off relative to the orifice and therefore the resulting area of passage is made to change mechanically by an actuator (thermostatic, thermoelectric, electromechanical, solenoid, managed with direct feedback from the valve or remote, etc.) during the normal regime of functioning of the system so as to vary the rate of flow which may traverse the valve in order to modify in time the point of regulation of the end unit or branch controlled by the valve.

The on-off function 4) is typically performed by an orifice/cut-off pair wherein the cut-off is brought, manually or by means of an actuator of whatsoever kind, to occlude totally the area of the orifice so as to inhibit the flowing of the thermal carrier fluid to the subsequent components of the system.

Figure 2A:
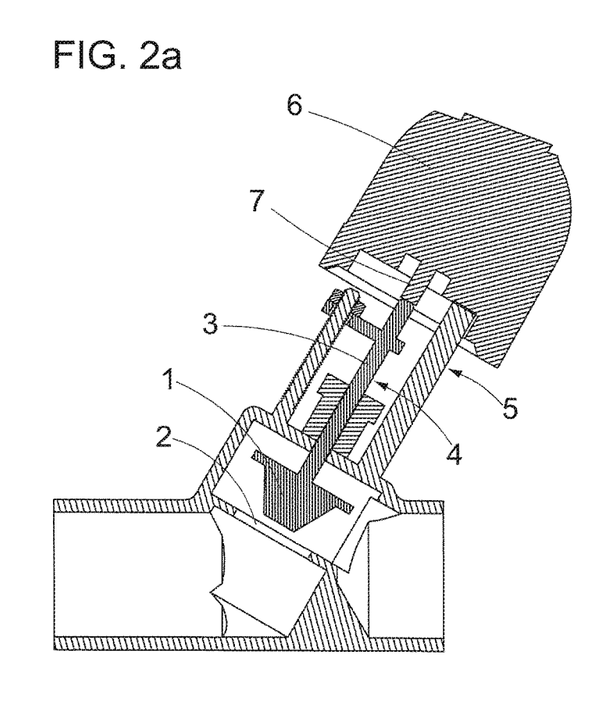
FIGS. 2a and 2b are schematic sectioned views of the functional unit "Kv" of a PICV valve of the prior art, respectively in the condition of maximum flow rate which can be preset and in a condition of intermediate presetting.
Figure 2B:
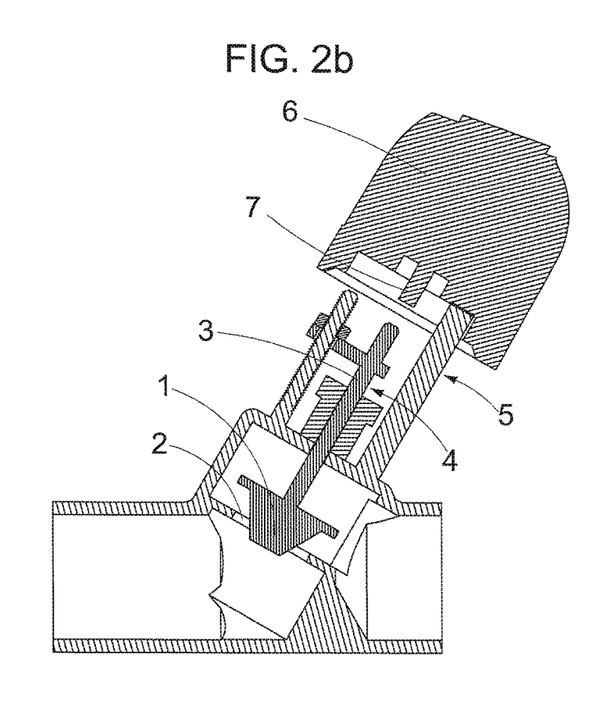

Given the high number of components necessary for performing functions 1)→4) and the high cost of the raw material (normally brass), typically used for the manufacture of the valves to be mounted on pipes small in diameter whereon the greater sales are made, the tendency of producers of this type of valve is that of grouping together the functions relative to the management of the flow rate 1), 3) and 4) in the smallest possible number of orifice/cut-off pairs to the extent that one of the solutions of greatest success sees all three of these functions performed by a single orifice whereon single mobile cut-off equipment acts, as shown schematically in the accompanying FIGS. 2a and 2b, having the following features:

- the end of the cut-off 1 which interacts with the orifice 2 is connected to a rod 3 to form mobile equipment 4 with respect to the valve body 5, which can translate with respect to the orifice for a given stroke length;
- the mobile equipment can be made to slide between two positions of maximum and minimum opening, separated by the given stroke, both by a mechanism with manual action and by the action of any linear actuator 6 mounted integrally with the valve body;
- the movement of the end of the cut-off consequent to the translation of the mobile equipment with respect to the orifice varies the area of passage available for the flow and therefore allows action to be taken on the flow rate;
- when the linear actuator is in the fully open position and the mobile equipment is positioned at the position of maximum opening, the area of passage available for the flow is the maximum allowed by the valve and corresponds to the maximum presettable flow rate (FIG. 2a);
- when the linear actuator is in the fully open position, by making the mobile equipment 4 translate manually with respect to the orifice by a certain portion of the stroke available (whether it can be done with the actuator 6 mounted or it has to be momentarily removed from the valve) the area of passage available to the flow is gradually narrowed, in this way limiting the maximum rate of flow which can pass through the valve or the operation of presetting is performed as per function 1) (FIG. 2b);
- the end of the cut-off which interacts with the orifice also has such a geometry that once pressed by the manual actuation or by the actuator on an appropriate seat at the orifice 2 it interrupts the flow allowing the on-off function.

Once the translation for the required presetting has been performed, having used an appropriate portion of the stroke available, the mobile equipment then has to be moved further to perform the function of modulation of the flow rate 3) wherein, in order to modulate the flow rate in time, the linear actuator mounted on the valve body further varies the position of the mobile equipment between the presetting position set and the minimum opening.

The functional limit of this solution therefore appears clear.

As illustrated in FIGS. 2a and 2b, according to one of the possible working methods, the action of manual presetting moves the end part of the rod of the cut-off equipment 4 away from the presser 7 of the actuator 6, thus making sure that during the subsequent phase of control modulating the movement of the presser no effect arises until it has once again reached the terminal end of the rod, all this however using a portion of the stroke, limited, made available by the actuator.

Therefore the stroke which can be used for the modulating regulation is reduced, with respect to the maximum one available, by the section used at presetting for the limitation of the maximum rate of flow which can traverse the valve: the regulation of the flow rate between the maximum ceiling and the minimum value allowed by the structure of the valve must therefore be distributed over a residual length which can also be very small (especially in heating systems where work is carried out with minimum flow rates), length over which the errors due to the inevitable mechanical, dimensional and coupling tolerances of the various components and of the actuator will be found to weigh increasingly in percentage terms, reducing in parallel the capacities for regulation of the valve and the precision of the regulation itself.

The valves disclosed in WO 2006/136158 A1 and WO 2009/135490 A2 represent two solutions to this problem, where regulation of the maximum flow rate takes place through rotation of two cylindrical elements whose degree of circumferential overlapping of the respective openings allows the maximum flow rate to be preset while the entire stroke of the pusher of the actuator is used for the axial translation of one of the two elements in the first case or of the entire equipment formed by the two elements in the second, permitting the further regulation of the flow rate which traverses the valve from the preset maximum value to zero. Given the complexity of the channels necessary for the passage of the fluid medium, the methodology necessary for the variation of these channels and the relative sliding seals between the cylindrical components of the sets of regulation equipment, both the abovementioned solutions can be realised only by means of very heavy and voluminous metal components which are complex to machine and therefore very costly, or by using components made in plastic material which is very sensitive to the environmental conditions as far as thermal expansions are concerned (therefore problems of precision during regulation) and of lower capacity for maintaining in time the functional features and therefore working life of the valve.

In US 2010/0170581 A1 a solution is proposed wherein, in order to supersede the state of the art and pursue the declared object of bringing the reading of the presetting outside of the zone of anchorage of the actuator, the flow rate is regulated by two separate sets of equipment, one which imposes a variation of area of an orifice to regulate the value of the maximum flow rate, the other which, using the entire stroke of the pusher of the actuator, varies the opening of a second orifice in order to modulate the flow rate. This solution, given the complexity of the mechanisms, shares the problems of the two previous solutions and presents a further one thereof: since the orifice of presetting of the maximum flow rate is separate and situated serially to that for the modulation, when it is subject to reduction of the area following presetting, the reduction of the area of the modulation orifice is not effective for the purpose of the variation of the flow until its area becomes smaller than that of the presetting orifice (water board phenomenon) therefore effectively rendering once again useless a first portion of the stroke of modulation made available by the pusher of the actuator.

BRIEF SUMMARY OF THE INVENTION

The object of the invention is that of obviating the aforesaid functional limits of the PICV valves of the prior art.

More particularly the object of the present invention is that of providing a PICV valve which has the following features:

maintaining of the grouping together of functions 1), 3) and 4) in a single orifice/cut-off pair;
   maintaining of the method of actuation by means of mobile equipment units with linear translation to allow the use of the linear actuators, more economical with respect to the rotary ones;
   for the previous two points maintaining of an effective and compact structure contained in a minimum volume with consequent saving of raw material.

The abovementioned and other objects are achieved by the PICV valve of the present invention which has the features of the appended independent claim 1.

Advantageous embodiments of the invention are disclosed by the dependent claims.

Substantially, the dynamic balancing valve for pressure independent flow rate control according to the invention, apt to be placed in hydraulic systems between an upstream fluid inlet duct and a downstream outlet duct, comprises a first functional unit "Kv" arranged between said inlet duct and said outlet duct, comprising mobile equipment which can be actuated manually or by means of an actuator for setting and modifying the span of a fluid passage orifice, and thus the valve flow rate, up to complete closure; and a second functional unit "Δp" apt to maintain the differential pressure on the two sides (between upstream and downstream) of said first unit "Kv" constant, and therefore the set flow rate of the valve independently of the fluctuations of the pressures in the hydraulic system, wherein said mobile equipment comprises main equipment and secondary equipment which can translate linearly with respect to the main equipment for presetting the maximum valve flow rate, the main equipment carrying integrally the secondary equipment and can be linearly displaced by means of said actuator for modulating the fluid flow rate from the preset maximum one up to complete closure.

Further features of the invention will be made clearer by the following detailed description, referred to a purely non-limiting exemplary embodiment thereof, illustrated in the accompanying drawings in which:

BRIEF DESCRIPTION OF THE DRAWINGS

FIGS. 3-7 are sectioned views of a valve according to the invention in different working conditions, in particular:

Referring to FIGS. 3 to 9, the automatic balancing valve with pressure independent control, which here below will be referred to for the sake of brevity as PICV valve, has been denoted overall by reference numeral 10.

DETAILED DESCRIPTION OF THE PREFERRED EMBODIMENTS

It has a lower valve body 11 and an upper valve body 12 restrained integrally one to the other. The lower valve body 11 houses the aforesaid second functional unit "Δp", suitable for maintaining constant the pressure differential between upstream and downstream of said first functional unit "Kv", housed substantially in said upper body 12.

The second functional unit "Δp" is assigned to function 2), previously disclosed, i.e. to maintain constant the pressure differential between upstream and downstream of the first functional unit "Kv", and therefore to maintain the flow rate set independently of the fluctuations of the pressures in the hydraulic system wherein the valve is installed. The first functional unit "Kv" is instead assigned the other three functions 1), 3) and 4), respectively of presetting, modulation and complete closure (on-off) of the valve.

Figure 8:
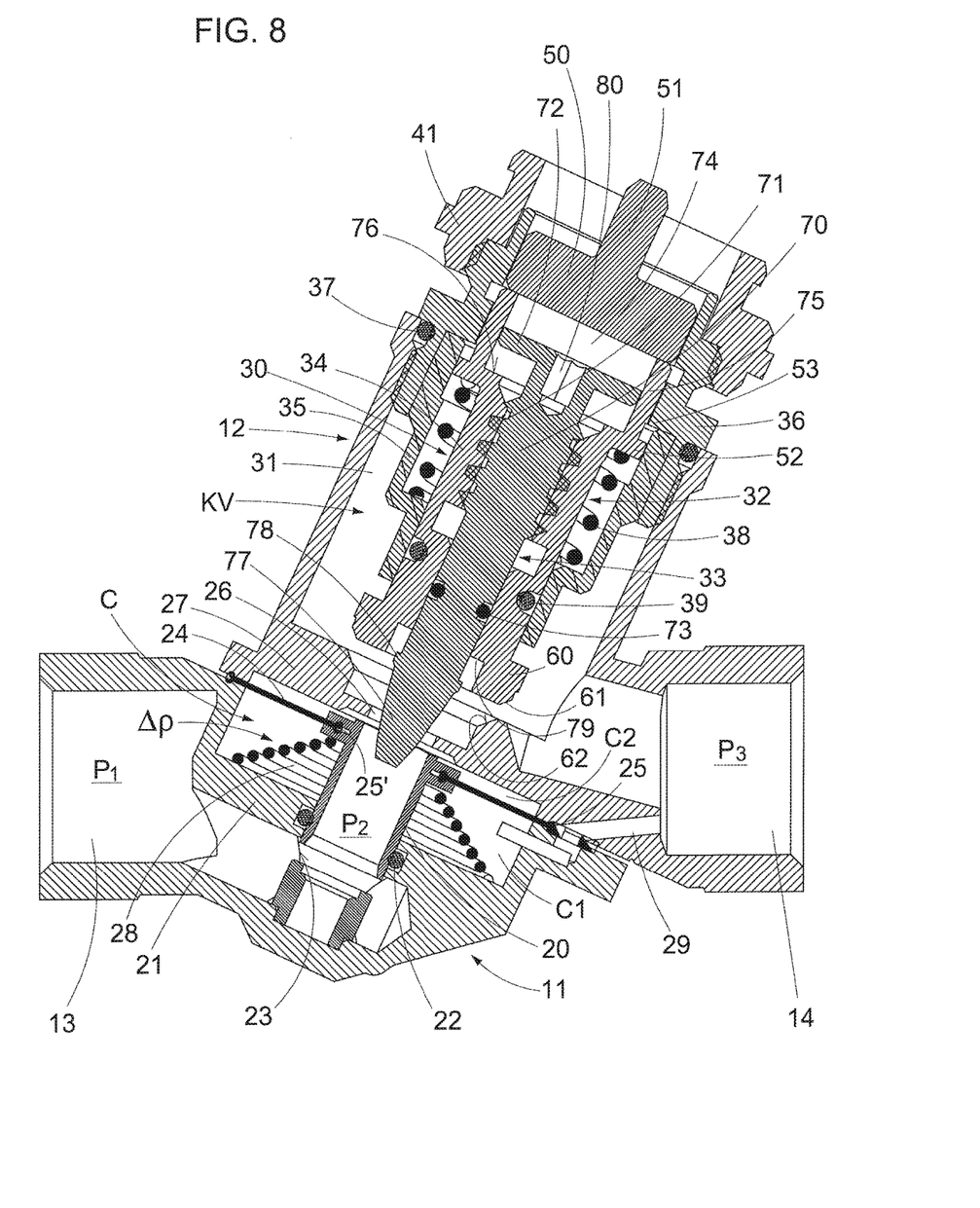
FIG. 8 is an enlarged detail of the valve without actuator, in a condition of modulation different from that of FIG. 6.
Figure 9:
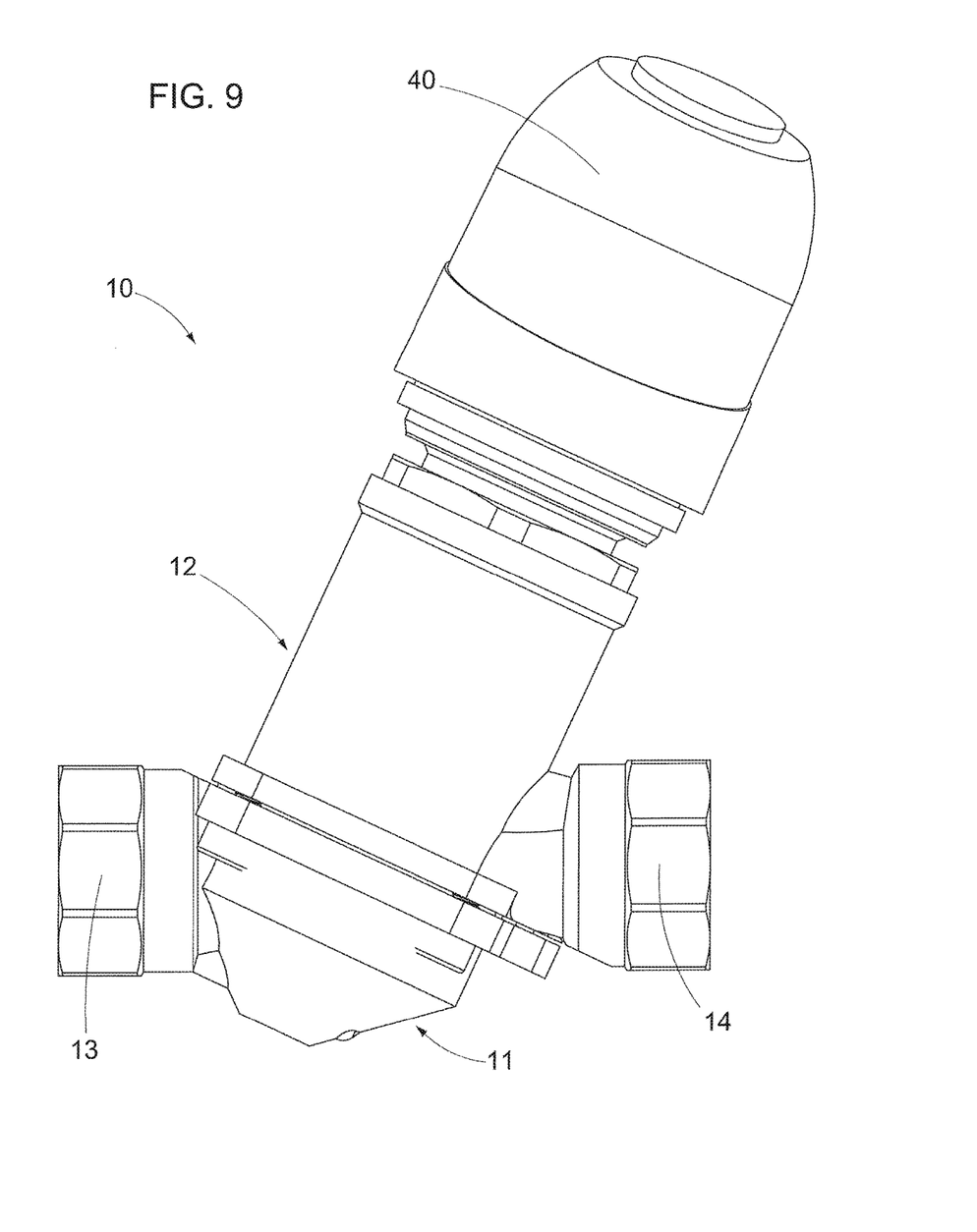
FIG. 9 is a schematic view showing the external appearance of the valve.

Referring in particular to FIG. 8 a brief description is now given of the functioning of the second functional unit "Δp" suitable for maintaining the flow rate set, to be considered in any case in itself known.

The second unit "Δp" is placed between an inlet duct 13 of the fluid in the valve and an outlet duct 14, formed respectively in the lower valve body 11 and upper valve body 12.

The second unit "Δp" comprises substantially a tubular slider/cut-off 20 housed in a chamber C and sliding axially in a hole formed in the base 21 of said chamber C, where a dynamic seal gasket 22 is placed, in order to vary a span 23 of passage of the fluid coming from the inlet duct 13.

Between the tubular slider 20 and the peripheral edge of the chamber C a diaphragm 24 is interposed, which divides the chamber C into a lower chamber C1 and an upper chamber C2 of considerably smaller dimensions.

The outer perimeter edge of the diaphragm 24 is blocked between the lower body 11 and the upper body 12 of the valve, where a static seal 25 is provided, while the inner perimeter edge is blocked in an annular groove placed peripherally to the tubular slider 20, where a further static seal 25' is provided.

The fluid from the inlet duct 13 passes through the aforesaid span 23, through the tubular slider 20, fills the abovementioned upper chamber C2, traverses an orifice 26 formed in the upper wall 27 of the chamber C, coinciding with the base wall of the upper body valve 12 and exits through the outlet duct 14.

The span of the aforesaid orifice 26, which determines the flow rate of the valve, is determined by the position of the cut-off of the unit "Kv", as will be described in greater detail here below.

A spring 28 acts on the tubular slider 20, which spring tends to push it in the direction of forward movement of the fluid, maintaining the diaphragm 24 in a position of equilibrium.

In the configuration shown, upstream of the valve, in the inlet duct 13, there is a pressure of the fluid $P_1$, which is reduced to $P_2$ in the tubular slider 20 for the passage through the narrowing 23, and is reduced further to $P_3$ downstream of the valve, in the outlet duct 14, due to the further narrowing through the span 26.

In the abovementioned upper chamber C2 reigns the same pressure $P_2$ that is inside the tubular slider 20, since a span of passage of the fluid exists between the upper edge of the tubular slider 20 and the upper wall 27 of the chamber C, while in the aforesaid lower chamber C1 reigns the same pressure $P_3$ existing downstream of the valve, given that there is a channel 29 which places in communication the outlet duct 14 with the chamber C1.

The structure of the unit "Δp" is such as to maintain always the same pressure differential $P_2$–$P_3$ on either side of the functional unit "Kv", and this is determined by the diaphragm 24, whose possible movement actuates the cut-off 20, which diaphragm is held in a position of equilibrium by the contrast between the action of the spring 28 and the difference between the pressures $P_2$ and $P_3$ which reign respectively in the upper chamber C2 and in the lower chamber C1, these pressures acting on the opposite surfaces of the diaphragm.

If, for whatsoever reason, the pressure $P_1$ upstream of the valve should increase, this would cause an increase in the pressure $P_2$ in the upper chamber $C_2$ causing a displacement downwards of the slider 20, and therefore a narrowing of the span 23 and a consequent decrease in the pressure $P_2$, maintaining, if the spring 28 is well calculated, the pressure differential between $P_2$ and $P_3$ virtually constant.

Contrarily, if the pressure $P_1$ upstream of the valve were to decrease, the pressure $P_2$ in said upper chamber C2 would decrease, so that the pressure $P_3$ in the lower chamber C1 tends to push upwards the diaphragm 24 and therefore the slider 20, widening the span 23 and making the pressure $P_2$, increase and therefore returning the pressure differential $P_2$–$P_3$ to the initial value.

A more detailed description is now given of the functional unit "Kv" according to the invention, performing the abovementioned functions 1), 3) and 4).

It comprises double mobile linear equipment 30, housed in a cylindrical seat 31 of the upper valve body 12, and is made up of main equipment 32, responsible for the function of modulation of the flow rate 3) and the on-off function 4), moved by a linear actuator 40, as will be explained in greater detail here below, and by second mobile linear equipment 33, responsible for the function 1) of presetting, coaxial to the previous one and whose relative position can be made to vary manually.

As shown in the drawings, the main mobile equipment 32, or modulating equipment, is made up of a hollow cylindrical body with several sections 34, mounted with the possibility of axial sliding in an outer sleeve 35, attached by means of a ring nut 36 to the upper valve body 12.

In the embodiment illustrated in the accompanying drawings, the ring nut 36 is attached through screwing to the upper valve body 12, and between the two elements a static seal gasket 37 is interposed, as also through screwing the sleeve 35 is restrained to the ring nut 36.

Other types of coupling between these elements are however possible, as it is also possible to provide the sleeve 35 and the ring nut 36 in a single body.

Between the main equipment 32 and the sleeve 35 a helical spring 38 is placed, which tends to push the main equipment towards the actuator 40, with interposition of a block 50 provided with a rod 51.

The hollow cylindrical body 34 of the main equipment 32 has below a widening 60 which goes to abut against the lower edge of the sleeve 35, and having at the lower end, made in metal or resilient material, a conical bevel 61, suitable for abutting against a conical hole 62, provided in said base wall 27 of the upper valve body 12, coaxial to and wider than said orifice 26, to determine the complete closure of the passage of fluid as will be explained in greater detail here below.

A dynamic seal gasket 39 is placed between the hollow cylindrical body 34 of the main equipment 32 and the outer sleeve 35.

The upper end of stroke of the main equipment 32 is determined by an annular widening 52, against which the abovementioned helical spring 38 acts, which goes to abut against an internal step 53 of the ring nut 36, as well as the possible abutting of the lower widening 60 of the main equipment against the lower edge of the sleeve 35.

Second mobile equipment or secondary equipment 33, which is required to perform the function of presetting of the valve, is placed inside the main equipment 32 and can translate axially with respect thereto by means of a screw coupling 71. A dynamic seal gasket 73 is placed between the two items of equipment.

The secondary equipment 33 is made up of a cylindrical pin 70 housed in the hollow cylindrical body 34 of the main equipment 32 and has above an annular flange 72 projecting radially, housed in a seat 74 determined by an upper cylindrical skirt 75 of the main body 32, of greater diameter with respect to the body 34, with which it forms an inner step 76, against which said annular flange 72 abuts, determining a lower end of stroke of the translation of the secondary equipment 33.

The outer surface of the skirt 75 has the shape of a polygonal prism (hexagonal, octagonal, etc.) suitable for axially sliding freely in a seat of corresponding prismatic geometry obtained in the ring nut 36 but to prevent the relative rotation thereof, so that when the secondary equipment 33 is screwed or unscrewed for setting the maximum flow rate, the main equipment 32 is prevented from rotating, thus allowing that the screwing/unscrewing action on the secondary equipment 33 is always followed by the relative axial sliding with respect to the main equipment 32.

The body or pin 70 of the secondary equipment 33 has below a conical tip 77, suitable for housing partially in the abovementioned orifice 26 formed in the base wall 27 of the upper valve body 12, in order to vary the span of passage of the fluid, and therefore the flow rate of the valve.

The configuration of the conical tip 77 is such that in the position of maximum insertion in the orifice 26 (see FIG. 7) it does not close completely the span of passage of the fluid.

Figure 3:
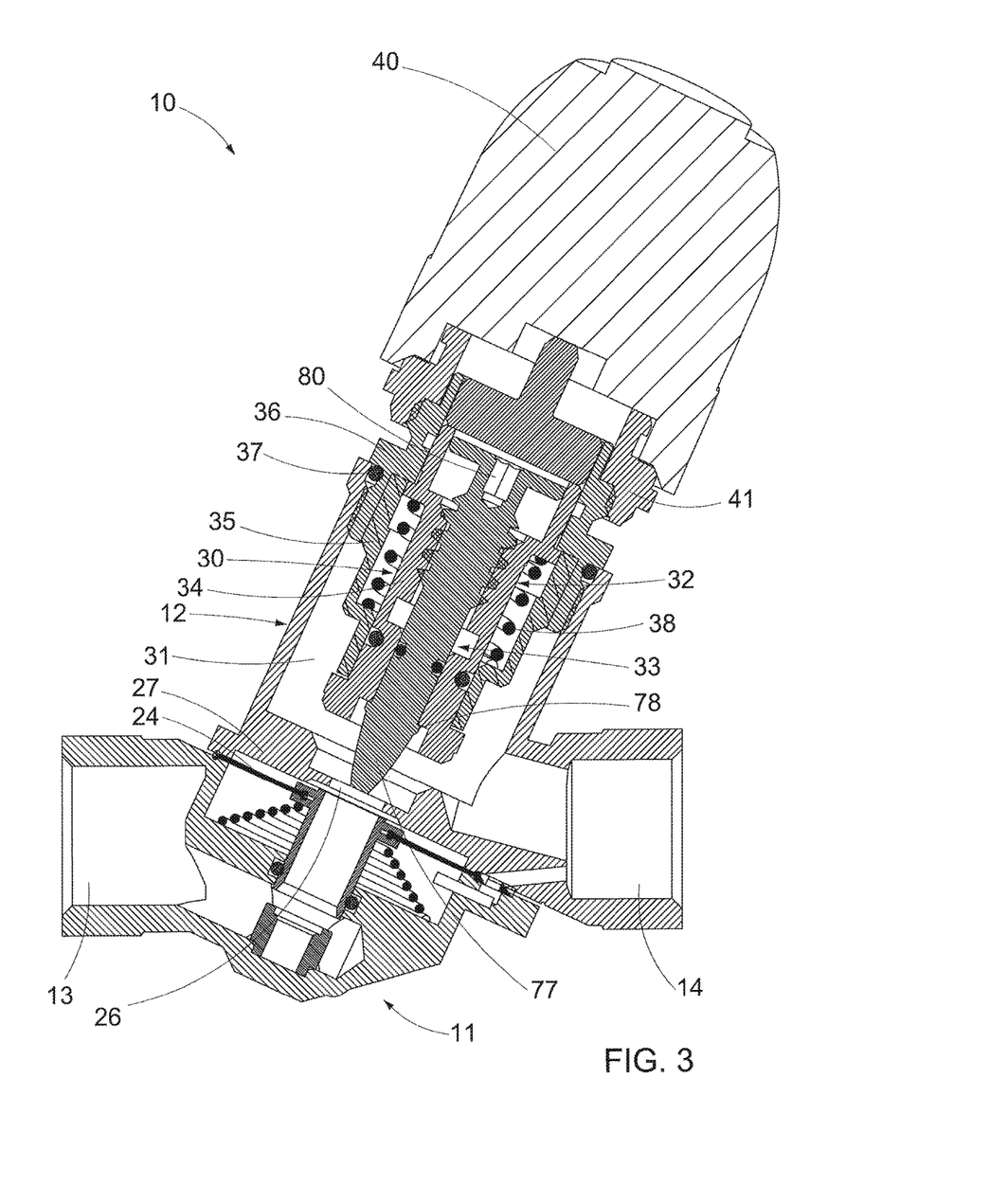
FIGS. 3, 4 and 5 show the valves in the conditions of presetting with maximum, intermediate and minimum flow rate, respectively.

The pin 70 also has, at the base of the aforesaid conical tip 77, an annular raised part 78, suitable for abutting against an inner annular shoulder 79 of the main equipment 32, in order to determine an upper end of stroke position of the secondary equipment 33 with respect to the main equipment 32 (see FIG. 3).

The translation of the secondary equipment 33 with respect to the main equipment 32 is normally performed manually, removing the actuator 40 and the block 50, and acting for example with an Allen key (not shown) in a corresponding shaped hole 80 provided above the pin 70.

Naturally other methods of regulation of the position of the secondary equipment 33 with respect to the main equipment 32 are contemplated, even without the removal of the actuator 40, providing for example a radial hole in the ring nut 36 and in the skirt 75, for the introduction of a tool which allows the rotation of the pin 70 or an inlet in the lower valve body 12 via which entry is possible with appropriate mechanical means suitable for varying the positioning of the mobile equipment 33.

In the accompanying drawings the actuator 40 is shown at schematic level, and is mounted on the valve body, more specifically on said ring nut 36 by means of a screw attachment 41.

In this case too other types of attachment of the actuator 40 are obviously possible, which actuator is for example a small electric motor which goes to act with a pusher 42 on the rod 51 of the block 50 for the transmission of motion to the functional unit "Kv". In the accompanying drawings the pusher 42 is schematised with a stem which projects in a differentiated manner from the actuator 40 according to the working conditions of the valve, as will now be described.

Referring in particular to FIGS. 3 to 7, a description will now be given of the different modes of functioning of the PICV valve according to the invention.

Figure 4:
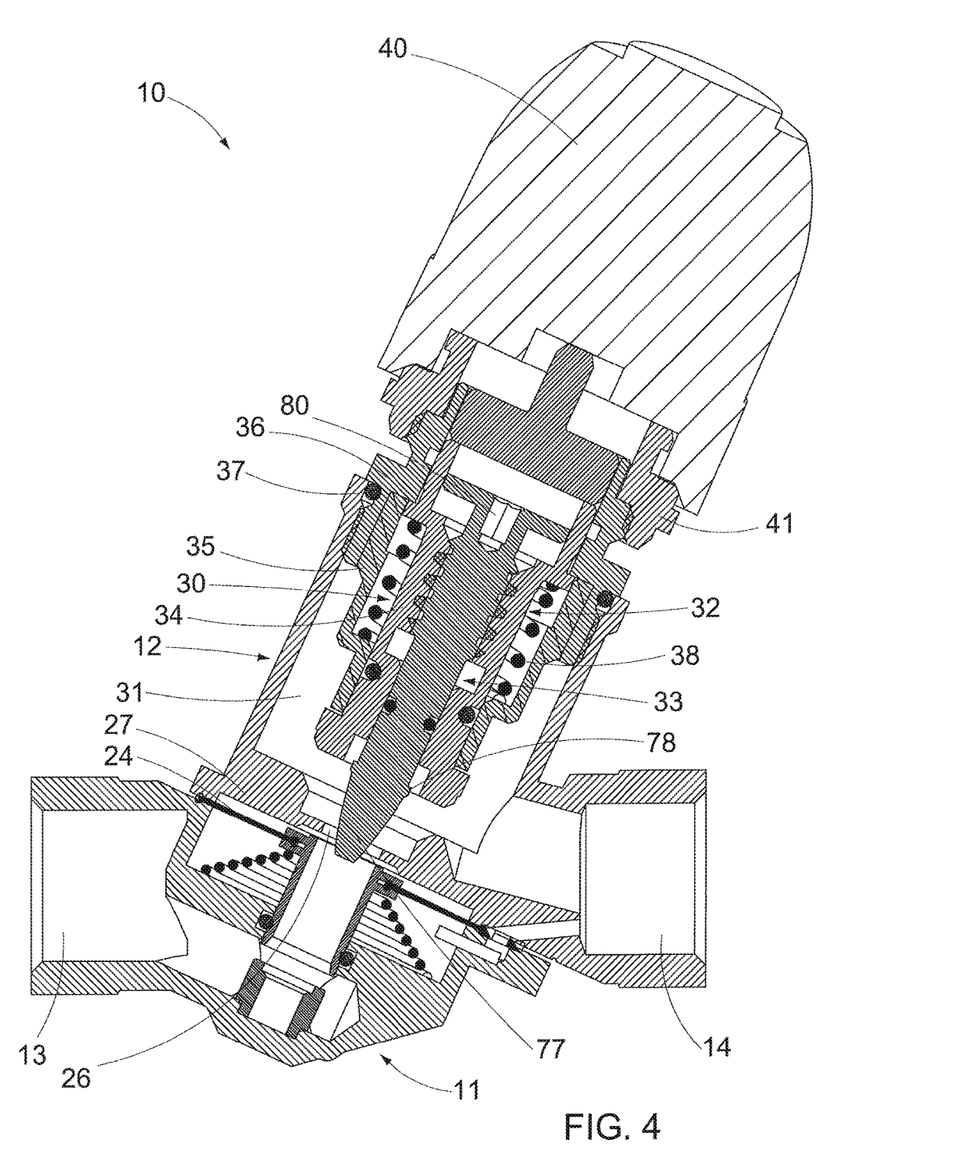
Figure 5:
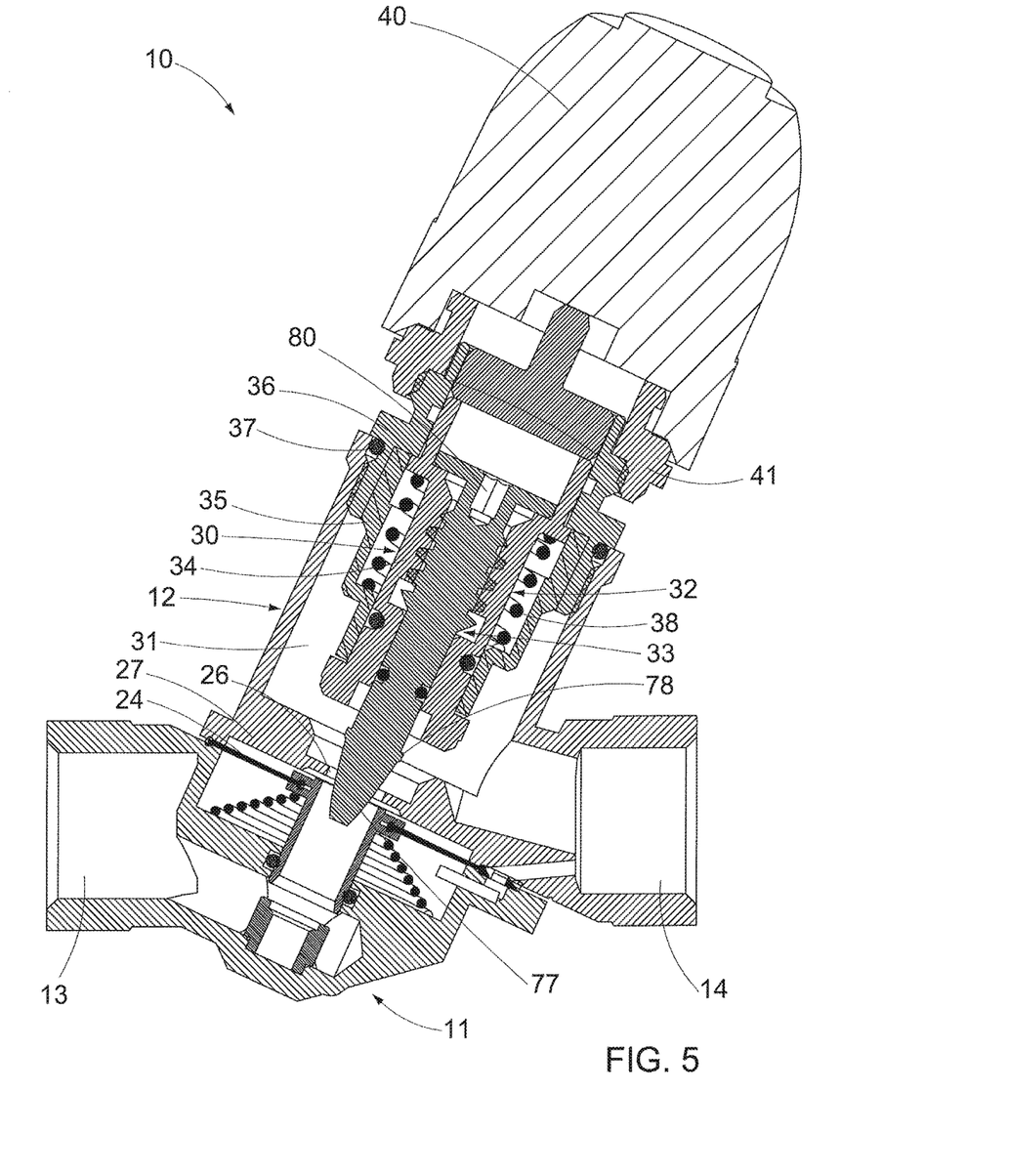

First of all the condition of maximum flow rate allowed for the valve is established, and this is obtained by performing a presetting by acting manually on the secondary equipment 33, making it translate linearly with respect to the main equipment 32, without this entailing a displacement of the main equipment with respect to the actuator 40, which remains inactive and therefore has not had to use part of the stroke of the pusher 42, as can be seen in FIGS. 3, 4 and 5.

These drawings illustrate respectively a presetting wherein there is a maximum flow rate, i.e. minimum occlusion of the orifice 26, with the pin 70 of the secondary equipment in the position of upper end of stroke (FIG. 3); a presetting wherein there is an intermediate flow rate (FIG. 4); and a presetting wherein there is a minimum flow rate, determined by the maximum linear translation of the secondary equipment 33 with respect to the main equipment 32, wherein the abovementioned annular flange 72 of the secondary equipment abuts against the step 76 of the main equipment.

As mentioned, in these conditions of presetting there has been no displacement of the pusher 42 of the actuator, which therefore retains its entire stroke in order to actuate the main equipment 32, and therefore the entire unit "Kv" in order to perform modulation of the flow rate.

In fact, once presetting has been carried out, making the secondary equipment translate with respect to the main equipment, the assembly of the two items of equipment behaves as if it were a single block, so that the presetting second equipment 33 will be drawn by the movement of the modulating main equipment 32, creating a corresponding change in the span of passage of the fluid with consequent action of modulating control on the flow rate.

Figure 6:
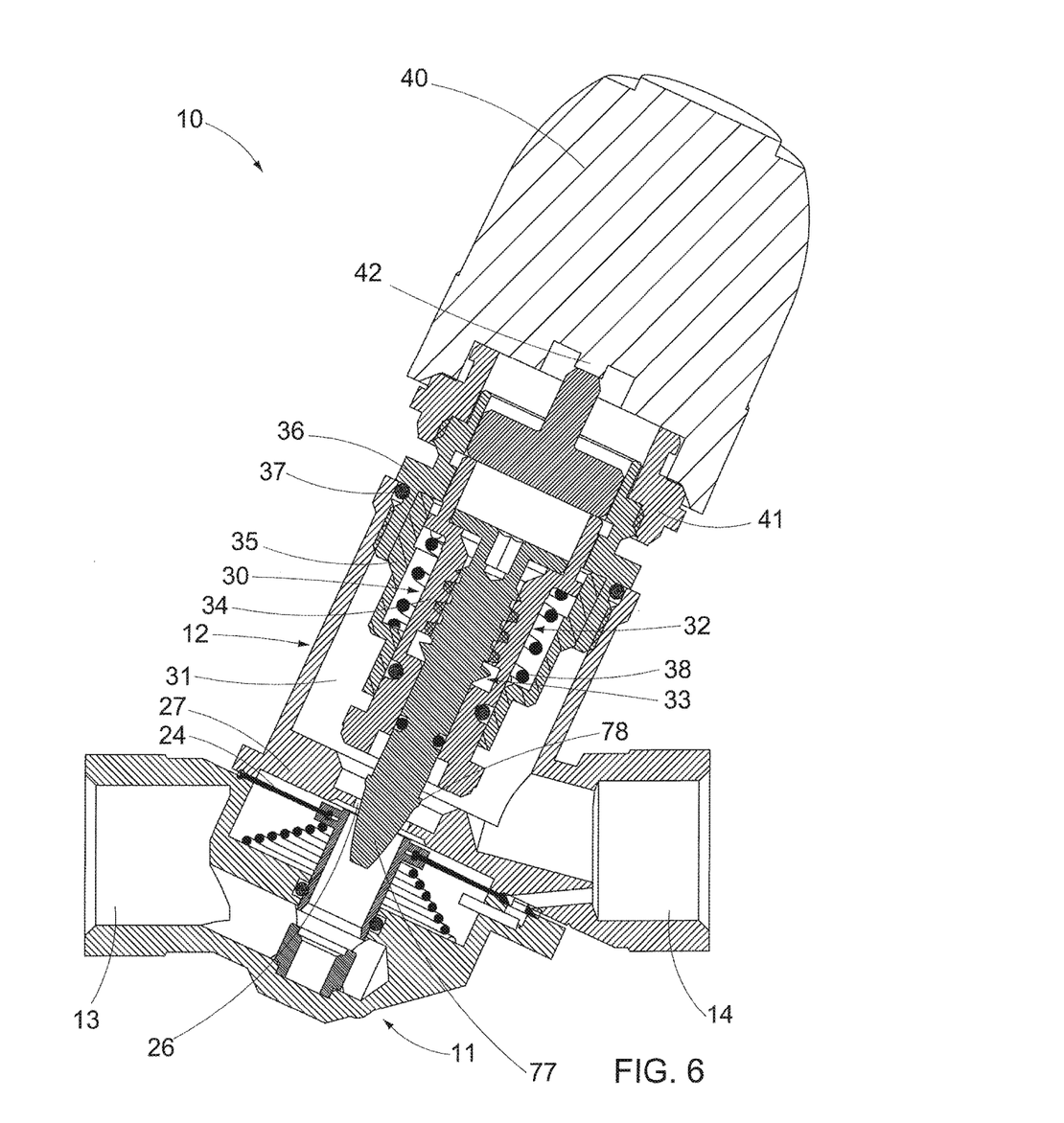
FIG. 6 shows the valve in a condition of modulation, and FIG. 7 in the condition of complete closure.

This is shown in FIG. 6, where it can be seen that, starting from a condition of presetting with minimum flow rate (FIG. 5), the pusher 42 of the actuator 40 has caused a displacement downwards of the entire unit "Kv" constituted by the two mobile items of equipment, in contrast to the action of the spring 38, reducing the span of passage of the fluid 26.

Figure 7:
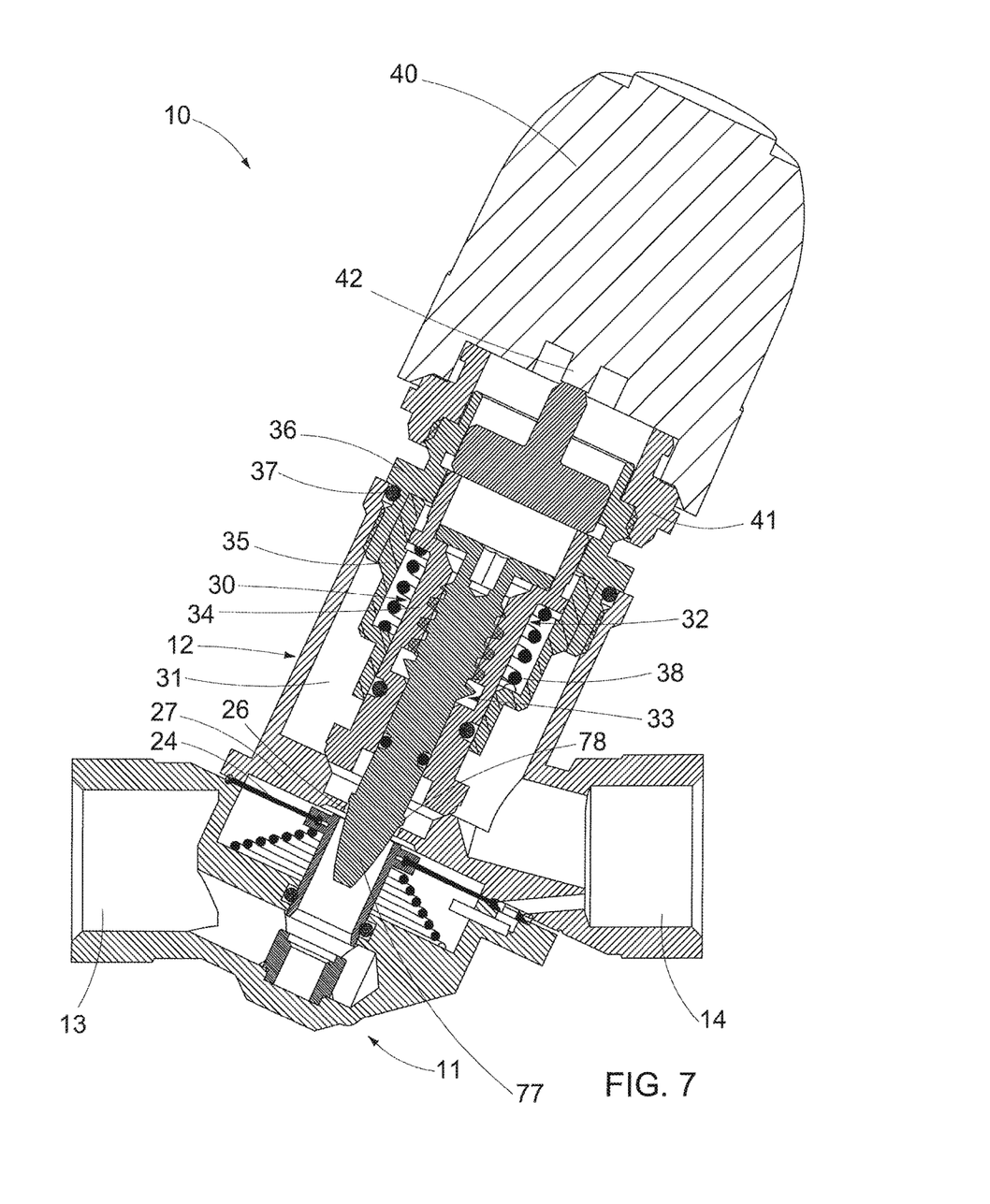

For the complete closure of the valve (on-off function) in the position of FIG. 6, the actuator 40 is actuated further making the pusher 42 project further and which, acting on the motion transmission rod 51, further lowers the assembly of the two items of equipment, bringing the conical bevel 61 in sealed abutment against the aforesaid conical hole 62 coaxial and external to the orifice 26 of regulation of the flow rate (FIG. 7). From what has been disclosed the advantages appear clear of the PICV valve according to the invention due to the doubling of the mobile equipment.

In fact the double mobile equipment structure allows, although maintaining the advantages present in the solution described in the prior art, separation of manual presetting of the maximum flow rate from modulation of the position of the regulation equipment: whatever the setting of the presetting starting from the position of maximum opening of the valve was, it will remain available to the actuator for the displacements necessary for the further reduction in the span of passage necessary for the modulating regulation again for the entire stroke provided in the design for the travel of the main equipment. The entire modulating regulation is distributed always over the entire length of the stroke available, therefore maintaining reduced to a minimum the influence of the mechanical tolerances of machining and assembly of the components. The modulating regulation will therefore be found to have the maximum possible effect also due to the strong reductions in the maximum flow rate preset.

The component materials of the valve are preferably metals such as brass, bronze, steel and the like.

The "$\Delta p$" unit, suitable for maintaining constant the set flow rate of the valve independently of the fluctuations of the pressures, can obviously be shaped differently from what is illustrated in the accompanying drawings.

Other interconnections may be provided between the two items of mobile equipment and between the latter and the valve body.

For example the two mobile linear items of equipment 32 and 33 can work with pulling rather than pushing by the actuator 40, in which case the respective cut-offs, appropriately shaped, are placed below the respective orifices of passage of the fluid, rather than above as shown in the drawings, working therefore in favour of the flow, rather than in opposition.

The reversal of the functions between the external/internal items of linear equipment can also be provided.

The presence of devices for indicating the degree of positioning of the cut-offs of the two items of equipment can also be provided, for example with the provision of graduated scales.

Naturally the invention is not limited to the particular embodiment previously described and illustrated in the accompanying drawings, but numerous detailed changes may be made thereto, within the reach of the person skilled in the art, without thereby departing from the scope of the invention itself as defined in the appended claims.

The invention claimed is:

1. A pressure independent flow rate control valve (PICV), apt to be placed in hydraulic systems between an upstream fluid inlet duct (13) and a downstream outlet duct (14), comprising:
   a first functional unit (Kv) arranged between said inlet duct (13) and said outlet duct (14), comprising mobile equipment (30) which can be actuated manually or by an actuator (40) for setting and modifying the span of an orifice of passage of the fluid, and thus the valve flow rate, up to complete closure; and
   a second functional unit ($\Delta p$) apt to maintain the differential pressure ($P_2-P_3$) between both sides upstream and downstream of said first unit (Kv) constant, and thus the set flow rate of the valve independently of the fluctuations of the pressures in the hydraulic system,
   wherein said mobile equipment (30) comprises main equipment (32) carrying integrally a secondary equipment (33),
   wherein the mobile equipment (30) is displaceable as a whole, by said actuator (40), for modulating the flow rate of the fluid from a preset maximum flow rate up to complete closure, and
   wherein the secondary equipment (33) is placed inside the main equipment (32) and the secondary equipment can linearly shift with respect to the main equipment (32) for pre-setting said maximum flow rate of the valve.

2. Valve according to claim 1, wherein said main equipment (32) and said secondary equipment (33) are coaxial one to the other and act on respective coaxial orifices (62, 26) of passage of the fluid.

3. Valve according to claim 2, wherein said main equipment (32) and said secondary equipment (33) are made integral by means of a threaded coupling (71).

4. Valve according to claim 2, wherein elastic means (38) are provided, acting on said main equipment (32) in contrast to the action of said actuator (40).

5. Valve according to claim 2, wherein said main equipment (32) is housed in a containment sleeve (35), where said elastic means (38) are placed, which tend to push the main equipment (32) towards said actuator (40), the latter working by thrust, by means of a pusher (42) and a transmission rod (51) which transmits the motion to the main equipment (32), to bring the items of equipment (32, 33) close to said orifices (62, 26).

6. Valve according to claim 5, wherein said secondary equipment (33) has a conical tip (77) shaped in such a way as not to completely occlude the corresponding orifice (26) when the items of equipment are in the end of stroke position, while the main equipment (32) has an end surface (61), made in metal or resilient material, suitable for interacting with said orifice (62) for preventing the passage of the fluid, so as to cause a complete closure of the valve.

7. Valve according to claim 2, wherein said secondary equipment (33), housed in the main equipment (32), has the shape of a cylindrical pin having an upper annular flange (72) housed in a widened skirt (75) of the main equipment (32) and suitable for abutting against a step (76) formed in the latter in the lower end of stroke position determining the minimum flow rate presetting condition, while at the base of said conical tip (77) an annular projection (78) is provided, suitable for abutting against a step (79) of the main equipment (32) in the upper end of stroke position of the secondary equipment, corresponding to the maximum flow rate presetting condition.

8. Valve according to claim 7, wherein the outer surface of the skirt (75) has the shape of a polygonal prism suitable for axially sliding freely in a seat of corresponding prismatic geometry obtained in a ring nut (36) but for preventing the relative rotation thereof, so that when the secondary equipment (33) is screwed or unscrewed for setting the maximum flow rate, the main equipment (32) is prevented from rotating, thus allowing the screwing/unscrewing action on the secondary equipment (33) to be always followed by the relative axial sliding with respect to the main equipment (32).

9. Valve according to claim 2, wherein a body of the valve comprises a lower valve body (11) and an upper valve body (12) integrally joined one to the other, said second functional unit ($\Delta p$) being housed in the lower valve body (11) and said first functional unit (Kv) being housed in the upper valve body (12), in a bottom wall (27) whereof said orifices (26, 62) are formed.

10. Valve according to claim 9, wherein said second functional unit (Δp) comprises a tubular slider (20) positioned below a first of said orifices (26) and pushed in the direction of the first orifice (26), without completely occluding it, by the action of a spring (28), said tubular slider (20) being housed in a chamber (C) which is divided into a lower chamber (C1) and an upper chamber (C2) by a diaphragm (24) having the shape of a circular crown, whose outer peripheral edge is blocked by said lower (11) and said upper (12) valve bodies and whose inner edge is restrained to the tubular slider (20), which is axially mobile for modifying an inlet span of the fluid (23) as a function of the pressures ($P_2$, $P_3$) which act respectively in said upper chamber (C2) and in said lower chamber (C1), in order to maintain the differential pressure between ($P_2$) and ($P_3$) under control.

11. Valve according to claim 3, wherein elastic means (38) are provided, acting on said main equipment (32) in contrast to the action of said actuator (40).

12. Valve according to claim 3, wherein said secondary equipment (33) is placed inside said main equipment (32).

13. Valve according to claim 4, wherein said secondary equipment (33) is placed inside said main equipment (32).

14. Valve according to claim 5, wherein said secondary equipment (33), housed in the main equipment (32), has the shape of a cylindrical pin having an upper annular flange (72) housed in a widened skirt (75) of the main equipment (32) and suitable for abutting against a step (76) formed in the latter in the lower end of stroke position determining the minimum flow rate presetting condition, while at the base of said conical tip (77) an annular projection (78) is provided, suitable for abutting against a step (79) of the main equipment (32) in the upper end of stroke position of the secondary equipment, corresponding to the maximum flow rate presetting condition.

15. Valve according to claim 6, wherein said secondary equipment (33), housed in the main equipment (32), has the shape of a cylindrical pin having an upper annular flange (72) housed in a widened skirt (75) of the main equipment (32) and suitable for abutting against a step (76) formed in the latter in the lower end of stroke position determining the minimum flow rate presetting condition, while at the base of said conical tip (77) an annular projection (78) is provided, suitable for abutting against a step (79) of the main equipment (32) in the upper end of stroke position of the secondary equipment, corresponding to the maximum flow rate presetting condition.

16. A pressure independent flow rate control valve (PICV), apt to be placed in hydraulic systems between an upstream fluid inlet duct (13) and a downstream outlet duct (14), comprising a first functional unit (Kv) arranged between said inlet duct (13) and said outlet duct (14), comprising mobile equipment (30) which can be actuated manually or by means of an actuator (40) for setting and modifying the span of an orifice of passage of the fluid, and thus the valve flow rate, up to complete closure; and a second functional unit (Δp) apt to maintain the differential pressure (P2–P3) between both sides upstream and downstream of said first unit (Kv) constant, and thus the set flow rate of the valve independently of the fluctuations of the pressures in the hydraulic system, wherein said mobile equipment (30) comprises main equipment (32) carrying integrally a secondary equipment (33), and being displaceable by means of said actuator (40) for modulating the flow rate of the fluid from a preset maximum flow rate up to complete closure, wherein the secondary equipment (33) can linearly shift with respect to the main equipment (32) for pre-setting said maximum flow rate of the valve, wherein said main equipment (32) and said secondary equipment (33) are coaxial one to the other and act on respective coaxial orifices (62, 26) of passage of the fluid, wherein said secondary equipment (33) is placed inside said main equipment (32), and wherein said main equipment (32) is housed in a containment sleeve (35), where said elastic means (38) are placed, which tend to push the main equipment (32) towards said actuator (40), the latter working by thrust, by means of a pusher (42) and a transmission rod (51) which transmits the motion to the main equipment (32), to bring the items of equipment (32, 33) close to said orifices (62, 26).

17. A pressure independent flow rate control valve (PICV), apt to be placed in hydraulic systems between an upstream fluid inlet duct (13) and a downstream outlet duct (14), comprising a first functional unit (Kv) arranged between said inlet duct (13) and said outlet duct (14), comprising mobile equipment (30) which can be actuated manually or by means of an actuator (40) for setting and modifying the span of an orifice of passage of the fluid, and thus the valve flow rate, up to complete closure; and a second functional unit (Δp) apt to maintain the differential pressure ($P_2$–$P_3$) between both sides upstream and downstream of said first unit (Kv) constant, and thus the set flow rate of the valve independently of the fluctuations of the pressures in the hydraulic system, wherein said mobile equipment (30) comprises main equipment (32) carrying integrally a secondary equipment (33), and being displaceable by means of said actuator (40), for modulating the flow rate of the fluid from a preset maximum flow rate up to complete closure, wherein the secondary equipment can linearly shift with respect to the main equipment (32) for pre-setting said maximum flow rate of the valve, wherein said main equipment (32) and said secondary equipment (33) are coaxial one to the other and act on respective coaxial orifices (62, 26) of passage of the fluid, wherein said secondary equipment (33) is placed inside said main equipment (32), and wherein said secondary equipment (33), housed in the main equipment (32), has the shape of a cylindrical pin having an upper annular flange (72) housed in a widened skirt (75) of the main equipment (32) and suitable for abutting against a step (76) formed in the latter in the lower end of stroke position determining the minimum flow rate presetting condition, while at the base of said conical tip (77) an annular projection (78) is provided, suitable for abutting against a step (79) of the main equipment (32) in the upper end of stroke position of the secondary equipment, corresponding to the maximum flow rate presetting condition.

\* \* \* \* \*